(No Model.)
C. A. SCHMIDT.
ROTATING SAMPLE STAND.
No. 288,870. Patented Nov. 20, 1883.
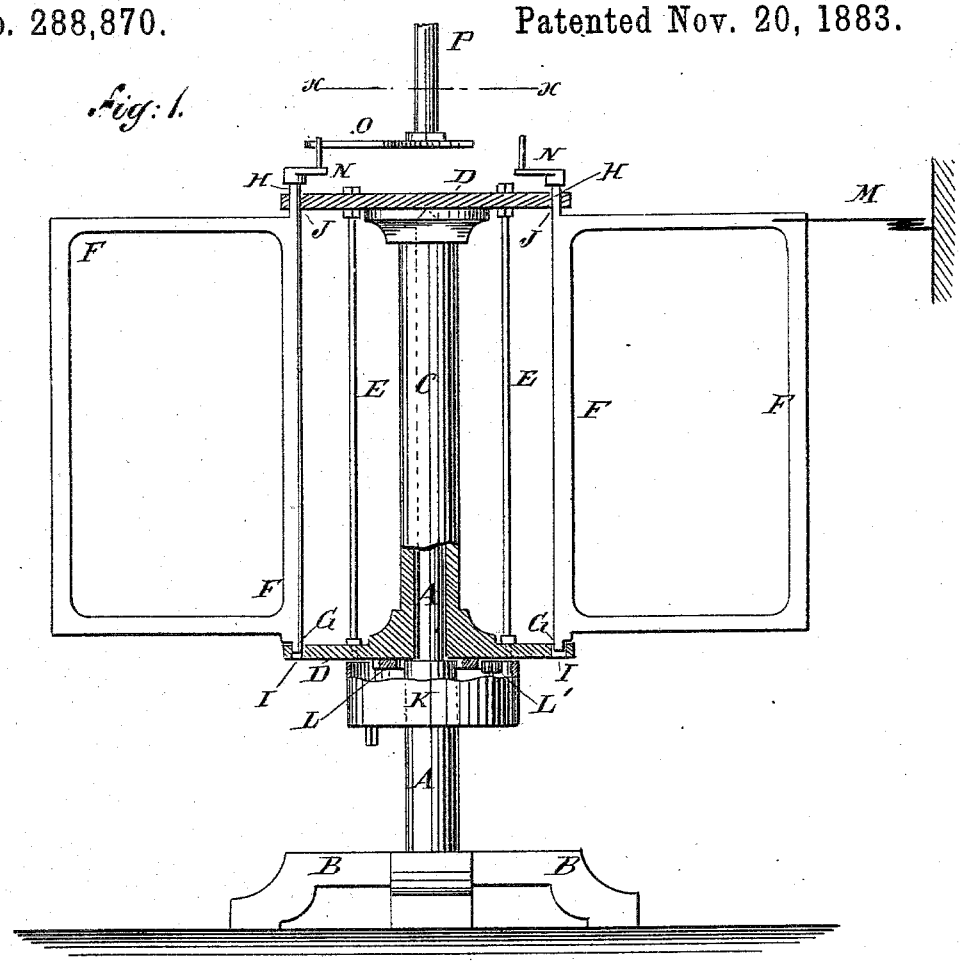
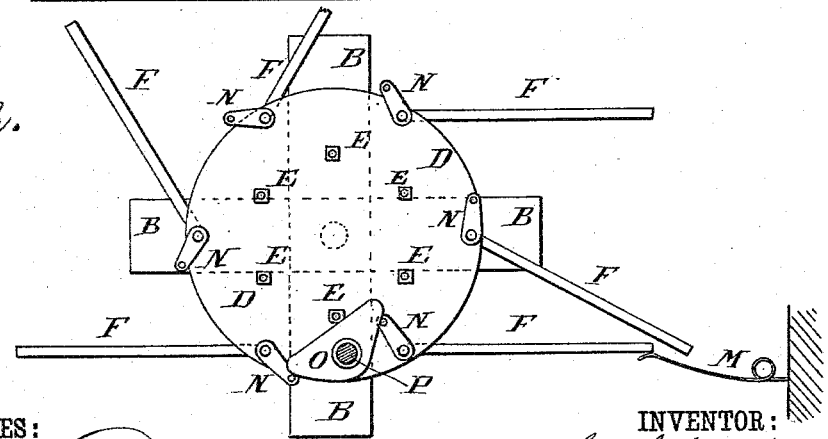

UNITED STATES PATENT OFFICE.

CHRISTIAN A. SCHMIDT, OF NEW YORK, N. Y.

ROTATING SAMPLE-STAND.

SPECIFICATION forming part of Letters Patent No. 288,870, dated November 20, 1883.

Application filed January 29, 1883. (No model.)

*To all whom it may concern:*

Be it known that I, CHRISTIAN AUGUSTUS SCHMIDT, of the city, county, and State of New York, have invented a new and useful Improvement in Rotary Sample-Stands, of which the following is a full, clear, and exact description.

Reference is to be had to the accompanying drawings, forming a part of this specification, in which similar letters of reference indicate corresponding parts in both the figures.

Figure 1 is a sectional side elevation of my improvement. Fig. 2 is a plan view of the same, partly in section, through the line $x\ x$, Fig. 1.

The object of this invention is to provide a simple and convenient means for effectively displaying samples of fringes and other goods.

The invention relates to a rotary sample-stand constructed with an upright spindle, a tubular shaft having end disks, and skeleton wings hinged to the said disks. The stand is rotated by a motor connected with the spindle and gearing into a gear-wheel attached to the lower disk of the tubular shaft, so that both sides of the wings hinged to the disks will be displayed. As the stand is rotated the outer edges of the hinged wings come in contact with a spring attached to a stationary support, and crank-arms attached to the upper pivots of the wings come in contact with a stationary cam suspended above the stand, so that the wings will be held and then turned quickly to allow the samples upon the opposite sides of the said wings to be distinctly seen, as will be hereinafter fully described.

A is a vertical spindle, the lower end of which is attached to a base-frame or pedestal, B. Upon the spindle A is placed a tubular shaft, C, to the upper and lower ends of which are attached disks D. When the shaft C is made long and the disks D large, the said disks are strengthened by rods or posts E, interposed between and attached to the said disks D, as shown in Fig. 1.

F are frames or skeleton wings, which have short pivots G, formed upon or attached to their lower inner corners, and long pivots H, formed upon or attached to their upper inner corners. The lower pivots, G, are placed in socket-bearings I in the lower disk D, near its outer edge. The upper pivots, H, pass through bearings J in the upper disk D, near its outer edge. The wings F are made a little shorter than the space between the disks D, as shown in Fig. 1, so that the said wings can be detached by raising the pivots G out of the sockets I and then lowering the said wings to withdraw the upper pivots, H, from their bearings J.

To the stand A B, or other suitable support, is attached an ordinary clock-work, K, or other suitable motor, which gears, by a pinion, L', into a gear-wheel, L, attached to the lower side of the lower disk D, so that the stand will be rotated by the said motor.

To the wall of the room, the casing of a show-window, or other suitable support, is attached a spring, M, which projects into such a position that as the stand is rotated the outer edge of each wing F will strike against the said spring and be detained, so that the samples upon the forward side of the said wing can be distinctly seen. As the outer edge of each wing F comes in contact with the spring M, a crank-arm, N, attached to the projecting end of the upper pivot, H, comes in contact with a stationary cam, O, attached to a hanger, P, secured to the ceiling of the room or other suitable support. The contact of the crank-arm N with the cam O swings the outer edge of the wing F, so that when the said outer edge escapes from the spring it will swing forward with an impulse and bring the samples upon the rear side of the said wing into view. The crank-arm N and the cam O hold the rear side of the wing F in view until the said crank-arm passes away from the said cam.

In using the stand, muslin or other suitable material is tacked, cemented, or otherwise secured to the opposite sides of the wings, and the samples of fringes or other goods are secured to the said material, so that the said samples can be readily changed.

Having thus fully described my invention, I claim as new and desire to secure by Letters Patent—

1. In a rotary sample-stand, the combination, with the spindles A, the tubular shaft C, and disks D and hinged wings F, of the spring M, substantially as herein shown and described, whereby the said wings will be detained to display the samples upon their forward sides, as set forth.

2. In a rotary sample-stand, the combination, with the spindles A, the tubular shaft C, and disks D and hinged wings F, of the crank-arms N and the stationary cam O, substantially as herein shown and described, whereby the said wings will be quickly reversed to display the samples attached to the rear sides of the wings, as set forth.

3. In a rotary sample-stand, the combination, with the rotating spindle A, the tubular shaft C, the disks D, and hinged wings F, of the spring M, the crank-arms N, and the stationary cam O, substantially as herein shown and described, whereby the said wings will be held and then turned quickly to allow the samples upon the opposite sides of the said wings to be distinctly seen, as set forth.

4. In a rotary sample-stand, the combination, with a vertical spindle, of a rotating disk with hinged wings on the same, and of a spring for holding the said wings open, so that the samples therein can be seen, substantially as herein shown and described, and for the purpose set forth.

CHRISTIAN AUGUSTUS SCHMIDT.

Witnesses:
JAMES T. GRAHAM,
EDGAR TATE.